United States Patent
Qu

(10) Patent No.: US 12,004,123 B2
(45) Date of Patent: Jun. 4, 2024

(54) SIDELINK TRANSMISSION METHOD, AND TERMINAL AND COMPUTER-READABLE STORAGE MEDIUM

(71) Applicant: BEIJING UNISOC COMMUNICATIONS TECHNOLOGY CO., LTD., Beijing (CN)

(72) Inventor: Xin Qu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 441 days.

(21) Appl. No.: 17/289,692

(22) PCT Filed: Oct. 14, 2019

(86) PCT No.: PCT/CN2019/110944
§ 371 (c)(1),
(2) Date: Apr. 28, 2021

(87) PCT Pub. No.: WO2020/088227
PCT Pub. Date: May 7, 2020

(65) Prior Publication Data
US 2021/0410112 A1 Dec. 30, 2021

(30) Foreign Application Priority Data
Nov. 2, 2018 (CN) .......................... 201811300749.2

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC . H04W 72/02; H04W 72/20; H04W 72/0446; H04W 72/0453
See application file for complete search history.

(56) References Cited

U.S. PATENT DOCUMENTS 9,888,505 B2    2/2018    Zhang et al.
10,314,089 B2   6/2019    Zhang et al.
(Continued)

FOREIGN PATENT DOCUMENTS

CN    105517154 A    4/2016
CN    107277922 A    10/2017
(Continued)

OTHER PUBLICATIONS

First Chinese Office Action regarding Applicartion No. 201811300749.2 dated Oct. 28, 2021. English translation provided by Unitalen Attorneys at Law.
(Continued)

*Primary Examiner* — Won Tae C Kim
(74) *Attorney, Agent, or Firm* — Harness, Dickey & Pierce, P.L.C.

(57) ABSTRACT

Disclosed are a sidelink transmission method, and a terminal and a computer-readable storage medium. The method comprises: acquiring a time domain resource, on a sidelink, for transmission; and taking a preset position on the time domain resource as a time domain sending position of sidelink control information, and sending the sidelink control information on the sidelink. The application of the above-mentioned solution enables a receiving terminal to determine the specific sending position, on the time domain
(Continued)

resource, of the sidelink control information, and can reduce the complexity of a blind test of the receiving terminal, improve receiving efficiency and reduce the power consumption of the receiving terminal.

14 Claims, 4 Drawing Sheets

(51) Int. Cl.
  *H04W 72/0453* (2023.01)
  *H04W 72/20* (2023.01)

(56) References Cited

U.S. PATENT DOCUMENTS

| | | | |
|---|---|---|---|
| 11,184,951 | B2 | 11/2021 | Zeng et al. |
| 2017/0280489 | A1 | 9/2017 | Zhang et al. |
| 2018/0160460 | A1 | 6/2018 | Zhang et al. |
| 2019/0014577 | A1* | 1/2019 | Yang ............... H04L 5/0053 |
| 2019/0069200 | A1 | 2/2019 | Zhang et al. |
| 2019/0289649 | A1 | 9/2019 | Zhang et al. |
| 2019/0357304 | A1 | 11/2019 | Zeng et al. |

FOREIGN PATENT DOCUMENTS

| | | |
|---|---|---|
| CN | 107370561 A | 11/2017 |
| CN | 107592327 A | 1/2018 |
| CN | 108632781 A | 10/2018 |
| WO | WO-2018027996 A1 | 2/2018 |
| WO | WO-2018062980 A1 | 4/2018 |
| WO | WO-2018174661 A1 | 9/2018 |

OTHER PUBLICATIONS

Ericsson, "On Mode 2 Resource Allocation for NR Sidelink," Chengdue, China, Oct. 8-12, 2018, pp. 1-11.
Oppo, "Discussion of Physical Layer Structure and Procedure for NR-V2X," Oct. 8-12, 2018.
Intel Corporation, "Sidelink Physical Layer Structure and Procedues for NR V2X Communication," Oct. 8-12, 2018, pp. 1-14.
Second Chinese Office Action regarding Application No. 201811300749.2 dated Jan. 29, 2022.Engilsh translation provided by Unitalen Attorneys at Law.
Extended European Search Report regarding Application No. 19880230.8 dated May 25, 2022.
Ericsson, "On 2-Stage PSCCH-I Design" Chengdu, China, Oct. 2018.
International Search Report (English and Chinese) and Written Opinion (Chinese) of International Searching Authority issued in PCT/CN2019/110944, dated Jan. 2, 2020 (8 pages).

* cited by examiner sidelink TRANSMISSION METHOD, AND
TERMINAL AND COMPUTER-READABLE
STORAGE MEDIUM

CROSS-REFERENCE TO RELATED APPLICATIONS

This application is the national phase of International Application No. PCT/CN2019/110944, filed on Oct. 14, 2019, which claims the benefit of priority to Chinese Patent Application No. 201811300749.2, filed on Nov. 2, 2018, and entitled "S DELINK TRANSMISSION METHOD, TERMINAL AND COMPUTER READABLE STORAGE MEDIUM", the entire disclosures of each of the above applications are incorporated herein by reference.

TECHNICAL FIELD

The present disclosure generally relates to communication technology field, and more particularly, to a sidelink transmission method, a terminal a d a comps ter readable storage medium.

BACKGROUND

V2X (Vehicle to X), i.e., information exchange between vehicles and the outside world, is an essential technology of future intelligent transportation systems. The application of V2X technology enables communication between vehicles, between vehicles and pedestrians, and between vehicles and base stations, so that a series of traffic information such as real-time road conditions, road information and pedestrian information can be acquired, which can effectively improve driving safety, reduce congestion and improve traffic efficiency.

In Long Term Evolution (LTE), a User Equipment (UE) applying the V2X technology merely supports periodic services with a same data packet size. Compared with V2X of LTE, V2X of New Radio of the Fifth Generation Mobile Communication (5G) further supports periodic services with different packet sizes and aperiodic services.

To better meet service requirements of NR V2X, a resource awareness method combining short-term awareness and long-term awareness is currently adopted to select time-frequency resources for transmitting control information and data on a sidelink. The sidelink refers to a radio communication protocol between UEs without participation of a base station. The resource awareness is a method of determining whether time-frequency resources are occupied by decoding control information and/or performing signal energy measurement.

However, after the above method is used to determine the time-frequency resource for transmitting control information and data on the sidelink, exiting techniques haven't provided a solution for how to determine a transmission position of sidelink control information and data on the time-frequency resources.

SUMMARY

Embodiments of the present disclosure provide solutions for how to determine a time domain position of sidelink control information on time-frequency resources.

In an embodiment of the present disclosure, a sidelink transmission method is provided, including: acquiring a time-frequency resource for transmission on a sidelink; and taking a preset position on the time-frequency resource as a time domain transmission position of sidelink control information, and transmitting the sidelink control information on the sidelink.

Optionally, the preset position includes a first preset position or a second preset position, and taking a preset position on the time-frequency resource as a time domain transmission position of sidelink control information includes: determining that the preset position is the first preset position or the second preset position based on a time when the time-frequency resource is successfully acquired, wherein a start position of the first preset position is earlier than a start position of the second preset position in a time domain.

Optionally, a time domain length of the time-frequency resource is a resource selection time domain unit, and a frequency domain length of the time-frequency resource is at least one sub-channel, wherein the resource selection time domain unit includes one time slot, a plurality of time slots or a plurality of symbols, and the sub-channel includes at least one frequency domain resource block.

Optionally, the first preset position is first L symbols in the resource selection time domain unit, wherein L is a time domain length of the sidelink control information, and is a positive integer less than or equal to a total number of symbols in the resource selection time domain unit.

Optionally, the first preset position is the second to $(L+1)^{th}$ symbols in the resource selection time domain unit, wherein L is a time domain length of the sidelink control information and is a positive integer, and (L+1) is less than or equal to a total number of symbols in the resource selection time domain unit.

Optionally, the second preset position is the $(W+1)^{th}$ to $(W+L)^{th}$ symbols in the resource selection time domain unit, wherein the $W^{th}$ symbol is an end symbol of a time window in the resource selection time domain unit, L is a time domain length of the sidelink control information, W and L are both positive integers, (W+L) is less than or equal to a total number of symbols in the resource selection time domain unit, the time window is a maximum length of time allowed for resource awareness in the resource selection time domain unit, and a start symbol of the time window is a start symbol of the resource selection time domain unit.

Optionally, the second preset position is the $(W+2)^{th}$ to $(W+L+1)^{th}$ symbols in the resource selection time domain unit, wherein (W+L+1) is less than or equal to a total number of symbols in the resource selection time domain unit, L is a time domain length of the sidelink control information, and W and L are both positive integers.

Optionally, determining that the preset position is the first preset position or the second preset position based on a time when the time-frequency resource is successfully acquired includes: if the time when the time-frequency resource is successfully acquired is later than a start time of the first preset position, determining that the preset position is the second preset position; or if the time when the time-frequency resource is successfully acquired is earlier than or is the start time of the first preset position, determining that the preset position is the first preset position.

Optionally, when the preset position is the second preset position, the sidelink transmission method further includes: transmitting sidelink data corresponding to the sidelink control information at a start time of a first symbol or a second symbol after the time-frequency resource is successfully acquired within a time window where the time-frequency resource is acquired.

Optionally, the sidelink transmission method further includes: transmitting sidelink data corresponding to the sidelink control information at a start time of the preset position.

Optionally, the sidelink transmission method further includes: transmitting sidelink data corresponding to the sidelink control information at an end time of the preset position.

In an embodiment of the present disclosure, a terminal is provided, including: an acquiring circuitry configured to acquire a time-frequency resource for transmission on a sidelink; and a first transmitting circuitry configured to: take a preset position on the time-frequency resource as a time domain transmission position of sidelink control information, and transmit the sidelink control information on the sidelink.

Optionally, the preset position includes a first preset position or a second preset position, and the first transmitting circuitry is configured to determine that the preset position is the first preset position or the second preset position based on a time when the time-frequency resource is successfully acquired, wherein a start position of the first preset position is earlier than a start position of the second preset position in a time domain.

Optionally, a time domain length of the time-frequency resource is a resource selection time domain unit, and a frequency domain length of the time-frequency resource is at least one sub-channel, wherein the resource selection time domain unit includes one time slot, a plurality of time slots or a plurality of symbols, and the sub-channel includes at least one frequency domain resource block.

Optionally, the first preset position is first L symbols in the resource selection time domain unit, wherein L is a time domain length of the sidelink control information, and is a positive integer less than or equal to a total number of symbols in the resource selection time domain unit.

Optionally, the first preset position is the second to $(L+1)^{th}$ symbols in the resource selection time domain unit, wherein L is a time domain length of the sidelink control information and is a positive integer, and (L+1) is less than or equal to a total number of symbols in the resource selection time domain unit.

Optionally, the second preset position is the $(W+1)^{th}$ to $(W+L)^{th}$ symbols in the resource selection time domain unit, wherein the $W^{th}$ symbol is an end symbol of a time window in the resource selection time domain unit, L is a time domain length of the sidelink control information, W and L are both positive integers, (W+L) is less than or equal to a total number of symbols in the resource selection time domain unit, the time window is a maximum length of time allowed for resource awareness in the resource selection time domain unit, and a start symbol of the time window is a start symbol of the resource selection time domain unit.

Optionally, the second preset position is the $(W+2)^{th}$ to $(W+L+1)^{th}$ symbols in the resource selection time domain unit, wherein (W+L+1) is less than or equal to a total number of symbols in the resource selection time domain unit, L is a time domain length of the sidelink control information, and W and L are both positive integers.

Optionally, the first transmitting circuitry is configured to: if the time when the time-frequency resource is successfully acquired is later than a start time of the first preset position, determine that the preset position is the second preset position; or if the time when the time-frequency resource is successfully acquired is earlier than or is the start time of the first preset position, determine that the preset position is the first preset position.

Optionally, the terminal further includes a second transmitting circuitry configured to: when the preset position is the second preset position, transmit sidelink data corresponding to the sidelink control information at a start time of a first symbol or a second symbol after the time-frequency resource is successfully acquired within a time window where the time-frequency resource is acquired.

Optionally, the terminal further includes a third transmitting circuitry configured to transmit sidelink data corresponding to the sidelink control information at a start time of the preset position.

Optionally, the terminal further includes a fourth transmitting circuitry configured to transmit sidelink data corresponding to the sidelink control information at an end time of the preset position.

In an embodiment of the present disclosure, a computer readable storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, any one of the above methods is performed.

Embodiments of the present disclosure may provide following advantages.

In embodiments of the present disclosure, the preset position on the time-frequency resource for transmission on the sidelink serves as the time domain position for transmitting the sidelink control information, so that a receiving terminal can determine a specific transmission position of the sidelink control information on the time-frequency resource. Further, a transmitting terminal transmits the sidelink control information at a fixed position on the time-frequency resource, so that the receiving terminal does not need to blindly detect the sidelink control information at every possible moment of successful short-term awareness. Therefore, complexity of blind detection of the receiving terminal may be reduced, reception efficiency may be improved, and power consumption of the receiving terminal may be reduced.

DETAILED DESCRIPTION

In V2X of LTE, a semi-static resource selection method of long-term awareness is mainly adopted to acquire transmission resources. In NR V2X, due to increase of service types, the existing long-term awareness method cannot meet service requirements well. Therefore, it has been proposed to adopt a semi-static resource selection method combining short-term awareness and long-term awareness to determine time-frequency resources for transmitting control information and data on the sidelink.

However, after the time-frequency resources are determined using a combination of short-term awareness and long-term awareness, exiting techniques haven't provided a solution for how to set a time domain transmission position of the sidelink control information and data on the determined time-frequency resources.

In embodiments of the present disclosure, a sidelink transmission method is provided. The preset position on the time-frequency resource for transmission on the sidelink serves as the time domain position for transmitting the sidelink control information, so that a receiving terminal can determine a specific transmission position of the sidelink control information on the time-frequency resource. Further, the receiving terminal does not need to blindly detect the sidelink control information at every possible moment of successful short-term awareness. Therefore, complexity of blind detection of the receiving terminal may be reduced, reception efficiency may be improved, and power consumption of the receiving terminal may be reduced.

In order to clarify the objects, characteristics and advantages of the disclosure, embodiments of present disclosure will be described in detail in conjunction with accompanying drawings.

Figure 1:
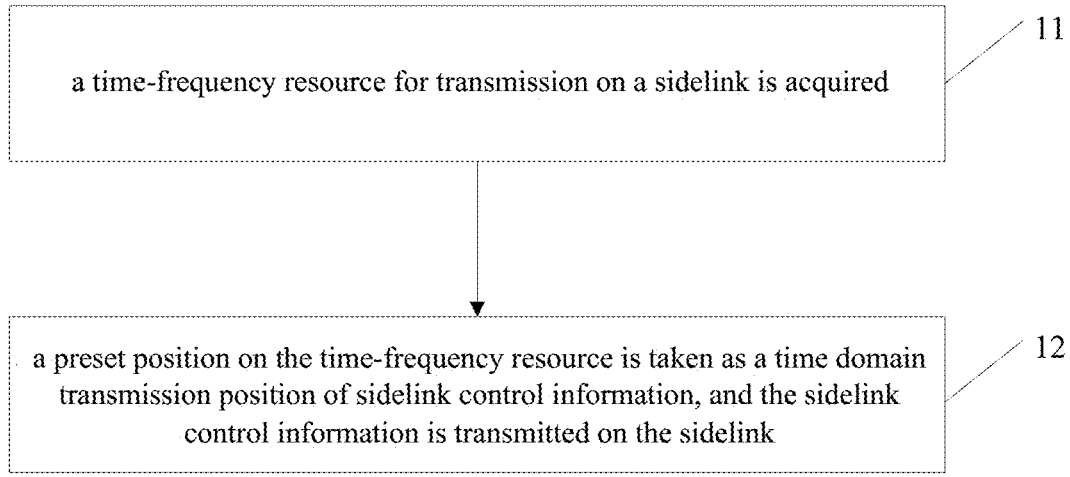
FIG. 1 is a flow chart of a sidelink transmission method according to an embodiment.

FIG. 1 is a flow chart of a sidelink transmission method according to an embodiment. Referring to FIG. 1, the method may include 11 and 12.

In 11, a time-frequency resource for transmission on a sidelink is acquired.

In some embodiments, the time-frequency resource for transmission on the sidelink may be acquired through various ways which are not limited.

Figure 2:
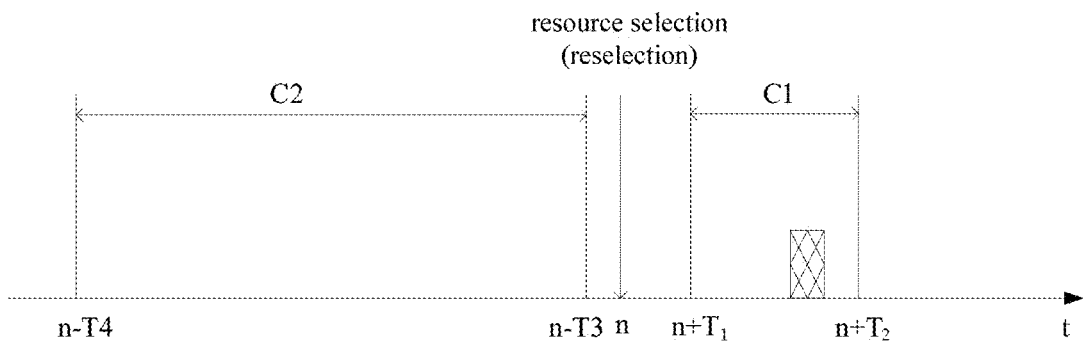
FIG. 2 is a diagram of a procedure for acquiring time-frequency resources according to an embodiment.

In some embodiments, to better meet service requirements of NR V2X, a combination of short-term awareness and long-term awareness is adopted to acquire the time-frequency resource for transmission on the sidelink. Detailed description is given below with reference to FIG. 2.

A terminal in the Internet of Vehicles initiates resource selection or reselection at time n. First, a resource selection window C1 with a time range from time (n+T1) to time (n+T2) is determined. The terminal can remove an unavailable time-frequency resource Z1 in the resource selection window C1 based on an awareness result in the time window C2, and select 20% of available time-frequency resource as candidate time-frequency resources Z2, where $0<T1<=4$, $20<=T2<=100$, a time range of the long-term awareness time window C2 is from time (n−T4) to time (n−T3), and $T4>T3>0$. In the embodiments of the present disclosure, for ease of description, the time window C2 is referred to as a long-term awareness time window.

Afterward, another time-frequency resource is randomly selected from the candidate time-frequency resources Z2, and short-term awareness is performed on the selected time-frequency resource. After the short-term awareness is successful, the selected time-frequency resource may be used to transmit sidelink control information and data. The terminal may generate a short-term awareness time window based on other factors such as service priority, but its length cannot exceed a maximum value of length of the short-term awareness time window.

The short-term awareness includes following steps. A value is randomly selected within the time window, and within a duration indicated by the value, the terminal performs energy measurement in a frequency domain range of the time-frequency resource randomly selected in the candidate resources Z2. During the duration, if the energy measurement values are all lower than a threshold, the selected time-frequency resource is considered to be idle and not occupied by other terminals, and the terminal may select the time-frequency resource to transmit sidelink control information and data. In the embodiments of the present disclosure, for ease of description, the time window in the short-term awareness is referred to as a short-term awareness time window.

In some embodiments, for periodic services, the terminal may reserve a currently acquired time-frequency resource and indicate it in the sidelink control information. When a next cycle arrives, the terminal may directly transmit the sidelink control information at a start time of the time-frequency resource reserved, without performing long-term awareness and short-term awareness again.

Therefore, when a value of zero is randomly selected in the short-term awareness time window, or when the acquired time-frequency resource is the reserved time-frequency resource, the terminal does not need to perform short-term awareness and can directly apply the sidelink transmission method provided in the embodiments of the present disclosure to determine the time domain transmission position of the sidelink control information and data. When a value of non-zero is randomly selected in the short-term awareness time window, and the acquired time-frequency resource is not the reserved time-frequency resource, the terminal may perform short-term awareness based on the randomly selected value, and further apply the sidelink transmission method provided in the embodiments of the present disclosure to determine the time domain transmission position of the sidelink control information and data.

It could be understood that no matter what method is used to obtain the time-frequency resource, the present disclosure is not limited thereto, and all fall within the scope of the present disclosure.

In 12, a preset position on the time-frequency resource is taken as a time domain transmission position of sidelink control information, and the sidelink control information is transmitted on the sidelink.

In some embodiments, one or more fixed positions on the time-frequency resource may be taken as the time domain transmission position of the sidelink control information in advance. The preset position may be set in a variety of ways.

In some embodiments, a time domain length of the time-frequency resource may be a resource selection time domain unit, a frequency domain length of the time-frequency resource may be at least one sub-channel, and a sub-channel may consist of several frequency domain resource blocks. The resource selection time domain unit includes one time slot, a plurality of time slots or a plurality of symbols, which is specifically configured or predefined by a higher layer. In this case, a start position of the short-term awareness time window is a start position of the resource selection time domain unit.

In some embodiments, the predetermined position may include a first predetermined position or a second predetermined position. A start position of the first preset position is before a start position of the second preset position in a time domain. In other words, a start time of the first preset position is earlier than a start time of the second preset position.

In some embodiments, it may be determined whether the preset position is the first preset location or the second preset location based on a time when the time-frequency resource is successfully acquired. Specifically, if the time when the time-frequency resource is successfully acquired is later than the start time of the first preset position, it is determined that the preset position is the second preset position. If the time when the time-frequency resource is successfully acquired is earlier than or equal to the start time of the first preset position, it is determined that the preset position is the first preset position.

In some embodiments, the first preset position and the second preset position may be set in a variety of ways which are not limited here. The terminal may adjust the time domain transmission position of the sidelink data based on the time domain transmission position of the sidelink control information. Generally, there is a corresponding relationship between the sidelink control information and sidelink data. The sidelink control information includes necessary information to successfully decode the sidelink data. The terminal may transmit the sidelink data first, or transmit the sidelink control information first.

The time domain transmission positions of the sidelink control information and the sidelink data are described in detail below in conjunction with FIGS. 3 to 9.

First, assume that a total number of symbols in the resource selection time domain unit is N, and a corresponding time range is from time $t_0$ to time $t_{N-1}$. A time domain length of the sidelink control information is L symbols, where L and N are both positive integers. Following ways may be used to set the time domain transmission position of the sidelink control information and the sidelink data.

Figure 3:
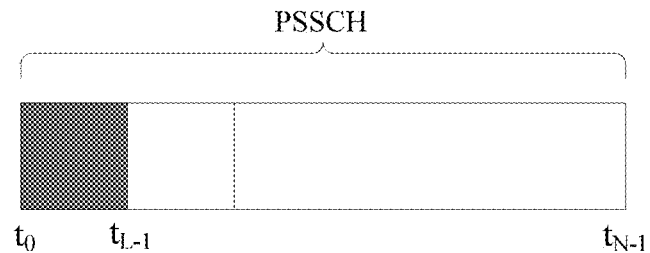
FIGS. 3 to 11 are diagrams of time domain transmission positions of sidelink control information and data according to embodiments.
Figure 4:
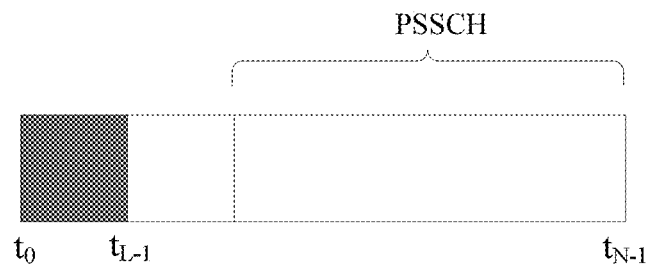

In some embodiments, referring to FIGS. 3 and 4, the first preset position may be first L symbols in the resource selection time domain unit, and a corresponding time range is from time $t_0$ to $t_{L-1}$, where L<=N.

When the first preset position is taken as the time domain transmission position of the sidelink control information, the corresponding sidelink data may be transmitted at the start time $t_0$ of the first preset position as shown in FIG. 3, or the corresponding sidelink data may be transmitted at the end time $t_{L-1}$ of the first preset position as shown in FIG. 4. The sidelink data is transmitted through a Physical Sidelink Shared Channel (PSSCH). In the embodiments of the present disclosure, for ease of description, the sidelink data is recorded as PSSCH.

Figure 5:
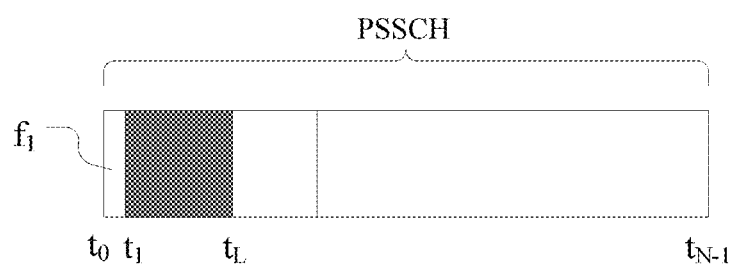
Figure 6:
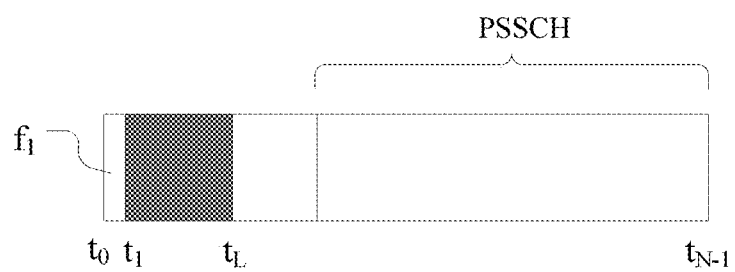

In some embodiments, referring to FIGS. 5 and 6, when a first symbol f1 of the resource selection time domain unit is a protection symbol and other information cannot be transmitted, the first preset position may be the second to $(L+1)^{th}$ symbols in the resource selection time domain unit, and a corresponding time range is from the symbol $t_1$ to $t_L$, where L+1<=N.

When the first preset position is taken as the time domain transmission position of the sidelink control information, the corresponding sidelink data may be transmitted at the start time $t_1$ of the first preset position as shown in FIG. 5, or the corresponding sidelink data may be transmitted at the end time $t_L$ of the first preset position as shown in FIG. 6.

Figure 7:
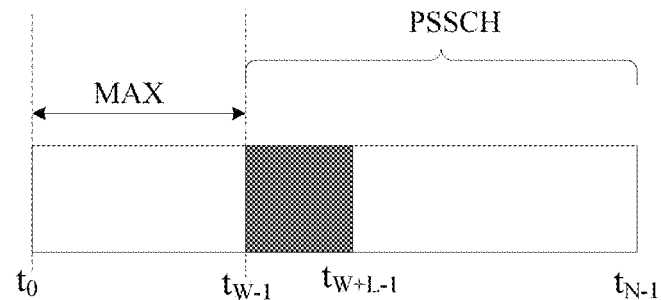
Figure 8:
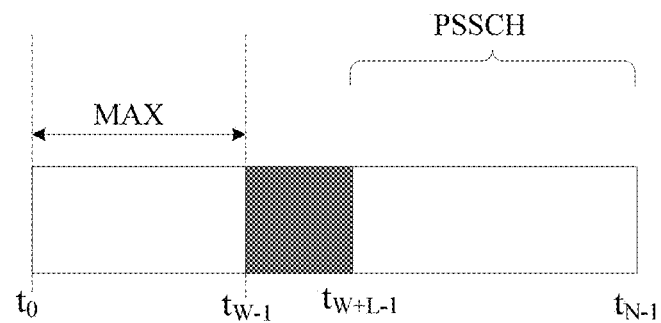

In some embodiments, referring to FIGS. 7 and 8, the second preset position may be the $(W+1)^{th}$ to $(W+L)^{th}$ symbols in the resource selection time domain unit, and a corresponding time range is from $t_{W-1}$ to $t_{W+L-1}$, the $W^{th}$ symbol is an end symbol of a time window MAX in the resource selection time domain unit, W is a positive integer, and W+L<=N. The time window MAX is a maximum length of time allowed for resource awareness in the resource selection time domain unit, and a start symbol of the time window MAX is a start symbol of the resource selection time domain unit.

When the second preset position is taken as the time domain transmission position of the sidelink control information, the corresponding sidelink data may be transmitted at the start time $t_{W-1}$ of the second preset position as shown in FIG. 7, or the corresponding sidelink data may be transmitted at the end time $t_{W+L-1}$ of the second preset position as shown in FIG. 8.

Figure 9:
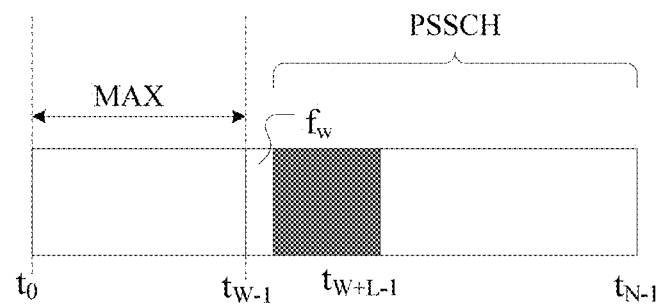
Figure 10:
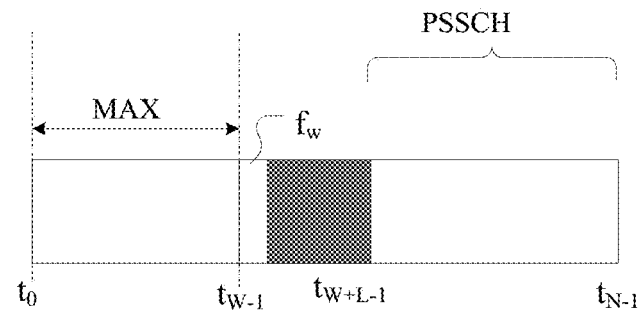

In some embodiments, referring to FIGS. 9 and 10, when the $(W+1)^{th}$ symbol fw is a protection symbol and other information cannot be transmitted, the second preset position may be the $(W+2)^{th}$ to $(W+L+1)^{th}$ symbols in the resource selection time domain unit, and a correspond time range is from $t_{W+1}$ to $t_{W+L}$, where W+L+1<=N.

When the second preset position is taken as the time domain transmission position of the sidelink control information, the corresponding sidelink data may be transmitted at the start time $t_{W+1}$ of the second preset position as shown in FIG. 9, or the corresponding sidelink data may be transmitted at the end time $t_{W+L}$ of the second preset position as shown in FIG. 10.

Regardless of whether the preset position is the first preset position or the second preset position, and whether the sidelink data corresponding to the sidelink control information is transmitted at the start time or the end time of the preset position, the receiving terminal determines a reception position of the sidelink data based on the start position of the sidelink control information, without using extra bits in the sidelink control information to indicate, thereby effectively saving bits occupied by the sidelink control information to save time-frequency resources.

Figure 11:
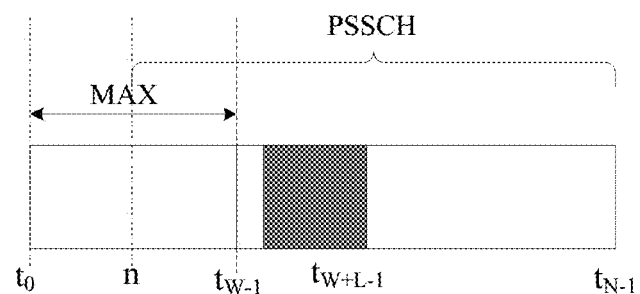

In some embodiments, to improve resource utilization, when the preset position is the second preset position, the method may further include: transmit sidelink data corresponding to the sidelink control information at a start time of a first symbol or a second symbol after the time-frequency resource is successfully acquired within a time window where the time-frequency resource is acquired. For example, referring to FIG. 11, the start time of the first symbol or the second symbol after the time-frequency resource is successfully acquired within the time window may be time n.

In some embodiments, the first preset position and the second preset position may be set in other ways. Regardless of how to set the first preset position and the second preset position, as long as they are fixed positions on the acquired time-frequency resource, all the setting ways are within the scope of the present disclosure.

From above, with the embodiments of the present disclosure, the preset position on the time-frequency resource for transmission on the sidelink serves as the time domain position for transmitting the sidelink control information, so that the receiving terminal can determine a specific transmission position of the sidelink control information on the time-frequency resource, thereby reducing complexity of blind detection of the receiving terminal, improving reception efficiency, and reducing power consumption of the receiving terminal.

In order to enable those skilled in the art to better understand and implement the present disclosure, a device and a computer readable storage medium corresponding to the above method are described in detail below.

Figure 12:
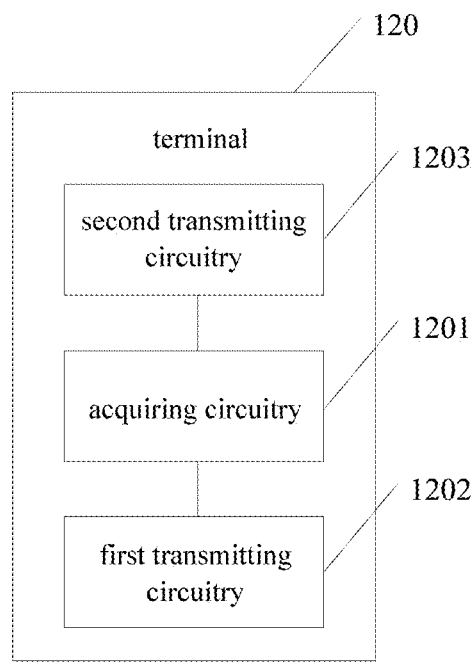
FIG. 12 is a structural diagram of a terminal according to an embodiment.

FIG. 12 is a structural diagram of a terminal 120 according to an embodiment. Referring to FIG. 12, the terminal 120 may include an acquiring circuitry 1201 and a first transmitting circuitry 1202.

The acquiring circuitry 1201 is configured to acquire a time-frequency resource for transmission on a sidelink; and the first transmitting circuitry 1202 is configured to: take a preset position on the time-frequency resource as a time domain transmission position of sidelink control information, and transmit the sidelink control information on the sidelink.

In some embodiments, the preset position includes a first preset position or a second preset position, and the first transmitting circuitry 1202 is configured to determine that the preset position is the first preset position or the second preset position based on a time when the time-frequency resource is successfully acquired, wherein a start position of the first preset position is earlier than a start position of the second preset position in a time domain.

In some embodiments, a time domain length of the time-frequency resource is a resource selection time domain unit, and a frequency domain length of the time-frequency resource is at least one sub-channel, wherein the resource selection time domain unit includes one time slot, a plurality of time slots or a plurality of symbols, and the sub-channel includes at least one frequency domain resource block.

In some embodiments, the first preset position is first L symbols in the resource selection time domain unit, wherein L is a time domain length of the sidelink control information, and is a positive integer less than or equal to a total number of symbols in the resource selection time domain unit.

In some embodiments, the first preset position is the second to $(L+1)^{th}$ symbols in the resource selection time domain unit, wherein L is a time domain length of the sidelink control information and is a positive integer, and $(L+1)$ is less than or equal to a total number of symbols in the resource selection time domain unit.

In some embodiments, the second preset position is the $(W+1)^{th}$ to $(W+L)^{th}$ symbols in the resource selection time domain unit, wherein the $W^{th}$ symbol is an end symbol of a time window in the resource selection time domain unit, L is a time domain length of the sidelink control information, W and L are both positive integers, $(W+L)$ is less than or equal to a total number of symbols in the resource selection time domain unit, the time window is a maximum length of time allowed for resource awareness in the resource selection time domain unit, and a start symbol of the time window is a start symbol of the resource selection time domain unit.

In some embodiments, the second preset position is the $(W+2)^{th}$ to $(W+L+1)^{th}$ symbols in the resource selection time domain unit, wherein $(W+L+1)$ is less than or equal to a total number of symbols in the resource selection time domain unit, L is a time domain length of the sidelink control information, and W and L are both positive integers.

In some embodiments, the first transmitting circuitry 1202 is configured to: if the time when the time-frequency resource is successfully acquired is later than a start time of the first preset position, determine that the preset position is the second preset position; or if the time when the time-frequency resource is successfully acquired is earlier than or is the start time of the first preset position, determine that the preset position is the first preset position.

In some embodiments, the terminal 120 further includes a second transmitting circuitry 1203 configured to: when the preset position is the second preset position, transmit sidelink data corresponding to the sidelink control information at a start time of a first symbol or a second symbol after the time-frequency resource is successfully acquired within a time window where the time-frequency resource is acquired.

In some embodiments, the terminal 120 further includes a third transmitting circuitry (not shown) configured to transmit sidelink data corresponding to the sidelink control information at a start time of the preset position.

In some embodiments, the terminal 120 further includes a fourth transmitting circuitry (not shown) configured to transmit sidelink data corresponding to the sidelink control information at an end time of the preset position.

In an embodiment of the present disclosure, a computer readable storage medium having computer instructions stored therein is provided, wherein when the computer instructions are executed, any one of the above sidelink transmission methods is performed.

In some embodiments, the computer readable storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, any one of the above uplink transmission methods is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A sidelink transmission method, comprising:
   acquiring a time-frequency resource for transmission on a sidelink; and
   taking a preset position on the time-frequency resource as a time domain transmission position of sidelink control information, and transmitting the sidelink control information on the sidelink;
   wherein the preset position comprises a first preset position or a second preset position, and taking a preset position on the time-frequency resource as a time domain transmission position of sidelink control information comprises:
   determining that the preset position is the first preset position or the second preset position based on a time when the time-frequency resource is successfully acquired, wherein a start position of the first preset position is earlier than a start position of the second preset position in a time domain,
   wherein determining that the preset position is the first preset position or the second preset position based on a time when the time-frequency resource is successfully acquired comprises: based on that the time when the time-frequency resource is successfully acquired is later than a start time of the first preset position, determining that the preset position is the second preset position; or based on that the time when the time-frequency resource is successfully acquired is earlier than or is the start time of the first preset position, determining that the preset position is the first preset position,
   wherein based on that the preset position is the second preset position, the method further comprises: transmitting sidelink data corresponding to the sidelink control information at a start time of a first symbol or a second symbol after the time-frequency resource is successfully acquired within a time window where the time-frequency resource is acquired.

2. The sidelink transmission method according to claim 1, wherein a time domain length of the time-frequency resource is a resource selection time domain unit, and a frequency domain length of the time-frequency resource is at least one sub-channel, wherein the resource selection time domain unit comprises one time slot, a plurality of time slots or a plurality of symbols, and the sub-channel comprises at least one frequency domain resource block.

3. The sidelink transmission method according to claim 2, wherein the first preset position is first L symbols in the resource selection time domain unit, wherein L is a time domain length of the sidelink control information, and is a positive integer less than or equal to a total number of symbols in the resource selection time domain unit.

4. The sidelink transmission method according to claim 2, wherein the first preset position is second to $(L+1)^{th}$ symbols in the resource selection time domain unit, wherein L is a time domain length of the sidelink control information and is a positive integer, and (L+1) is less than or equal to a total number of symbols in the resource selection time domain unit.

5. The sidelink transmission method according to claim 2, wherein the second preset position is $(W+1)^{th}$ to $(W+L)^{th}$ symbols in the resource selection time domain unit, wherein the $W^{th}$ symbol is an end symbol of a time window in the resource selection time domain unit, L is a time domain length of the sidelink control information, W and L are both positive integers, (W+L) is less than or equal to a total number of symbols in the resource selection time domain unit, the time window is a maximum length of time allowed for resource awareness in the resource selection time domain unit, and a start symbol of the time window is a start symbol of the resource selection time domain unit.

6. The sidelink transmission method according to claim 2, wherein the second preset position is $(W+2)^{th}$ to $(W+L+1)^{th}$ symbols in the resource selection time domain unit, wherein (W+L+1) is less than or equal to a total number of symbols in the resource selection time domain unit, L is a time domain length of the sidelink control information, and W and L are both positive integers.

7. A non-transitory computer readable storage medium having computer instructions stored therein, wherein when the computer instructions are executed, the method of claim 1 is performed.

8. A terminal comprising a memory and a processor, wherein the memory has computer instructions stored therein, and when the processor executes the computer instructions, the method of claim 1 is performed.

9. A terminal, comprising:
an acquiring circuitry configured to acquire a time-frequency resource for transmission on a sidelink; and
a first transmitting circuitry configured to: take a preset position on the time-frequency resource as a time domain transmission position of sidelink control information, and transmit the sidelink control information on the sideling;
wherein the preset position comprises a first preset position or a second preset position, and the first transmitting circuitry is configured to determine that the preset position is the first preset position or the second preset position based on a time when the time-frequency resource is successfully acquired, wherein a start position of the first preset position is earlier than a start position of the second preset position in a time domain, wherein the first transmitting circuitry is configured to:
based on that the time when the time-frequency resource is successfully acquired is later than a start time of the first preset position, determine that the preset position is the second preset position; or based on that the time when the time-frequency resource is successfully acquired is earlier than or is the start time of the first preset position, determine that the preset position is the first preset position,
wherein the terminal further comprises a second transmitting circuitry configured to: based on that the preset position is the second preset position, transmit sidelink data corresponding to the sidelink control information at a start time of a first symbol or a second symbol after the time-frequency resource is successfully acquired within a time window where the time-frequency resource is acquired.

10. The terminal according to claim 9, wherein a time domain length of the time-frequency resource is a resource selection time domain unit, and a frequency domain length of the time-frequency resource is at least one sub-channel, wherein the resource selection time domain unit comprises one time slot, a plurality of time slots or a plurality of symbols, and the sub-channel comprises at least one frequency domain resource block.

11. The terminal according to claim 10, wherein the first preset position is first L symbols in the resource selection time domain unit, wherein L is a time domain length of the sidelink control information, and is a positive integer less than or equal to a total number of symbols in the resource selection time domain unit.

12. The terminal according to claim 10, wherein the first preset position is second to $(L+1)^{th}$ symbols in the resource selection time domain unit, wherein L is a time domain length of the sidelink control information and is a positive integer, and (L+1) is less than or equal to a total number of symbols in the resource selection time domain unit.

13. The terminal according to claim 10, wherein the second preset position is $(W+1)^{th}$ to $(W+L)^{th}$ symbols in the resource selection time domain unit, wherein the $W^{th}$ symbol is an end symbol of a time window in the resource selection time domain unit, L is a time domain length of the sidelink control information, W and L are both positive integers, (W+L) is less than or equal to a total number of symbols in the resource selection time domain unit, the time window is a maximum length of time allowed for resource awareness in the resource selection time domain unit, and a start symbol of the time window is a start symbol of the resource selection time domain unit.

14. The terminal according to claim 10, wherein the second preset position is $(W+2)^{th}$ to $(W+L+1)^{th}$ symbols in the resource selection time domain unit, wherein (W+L+1) is less than or equal to a total number of symbols in the resource selection time domain unit, L is a time domain length of the sidelink control information, and W and L are both positive integers.

* * * * *